Patented May 6, 1930

1,757,470

UNITED STATES PATENT OFFICE

GEORGE B. PEEBLES, OF NEWARK, NEW JERSEY

HEAT-INSULATING MATERIAL

No Drawing.   Application filed August 8, 1928.   Serial No. 298,413.

This invention relates to heat insulating material and particularly to a composition which may be formed or molded in sheets and other shapes and employed as a structural material or as a sheathing.

The material is particularly adapted for use as wall board to replace fiber and plaster boards and has several advantages which make it superior to the latter materials. It is fire-proof and non-heat conducting, and it does not disintegrate when subjected to high temperatures. It is, moreover, tough and elastic and does not chip or crack.

Owing to its low heat conductivity the material is admirably adapted for use as an insulator for heat radiating or absorbing surfaces. It can be molded easily into any desired form for example to afford a covering for pipes or conduits through which hot or cold fluids are conducted.

Another advantage of the invention is that it affords a use for waste products which have long been regarded as useless and a nuisance. Large quantities of such products have accumulated and can be utilized together with the waste products which are discharged daily from large chemical plants.

The waste products referred to are those resulting from the manufacture of alkalis such as soda ash (sodium carbonate) and caustic soda (sodium hydroxide) and consist principally of mixtures of calcium compounds together with compounds of sodium, magnesium, iron, aluminum and silicon. Such products are produced in large quantities and thousands of tons thereof have been deposited in dumps. In fact, the disposition of this waste is a serious problem.

The composition of the products varies somewhat with the source and it is modified on exposure to the weather by the leaching of soluble compounds such as calcium chloride and sodium chloride therefrom. The waste product from the manufacture of soda ash by the ammonia-soda process consists principally of calcium oxide and/or hydroxide, calcium carbonate, calcium chloride and sodium chloride with varying proportions of silica, iron and aluminum oxides, magnesium oxide and calcium sulphate, some or all of which are precipitated or discharged partly in suspension and partly in solution. If weathered, the proportion of soluble constituents is lower and that of calcium hydroxide and carbonate is higher. The waste product from the manufacture of caustic soda is principally calcium carbonate with small amounts of silica, calcium oxide and/or hydroxide and magnesium oxide.

I have discovered that the waste products described which normally are not adapted for any practical use can be converted by slight additions and the application of pressure into a hard, dense, heat insulating and fire resisting material suitable for many purposes as hereinbefore indicated. To accomplish the purpose of the invention, the waste material is first dried. If fresh products are treated, evaporation may be necessary. The drying is completed at a temperature such as to remove all moisture and substantially all water of crystallization. The product is crushed and pulverized and is then mixed with suitable proportions of silicate of soda and magnesium oxide. It is formed into the desired shape either as a sheet or otherwise and is subjected to a very considerable pressure which serves to consolidate the material. Sheets or other forms may be reinforced with any suitable material such as paper, for example, which may be applied to the top and bottom of the sheets and/or as an intermediate layer. When the pressure is released the material is finished. It may be stored and shipped as desired, and it may be used as ordinary wall board or for special uses where heat insulation is required. Fibre such as asbestos may be mixed with the composition before it is subjected to pressure.

As an example of the invention, a waste product having substantially the following composition:

| | Per cent |
|---|---|
| Silica ($SiO_2$) | 5.84 |
| Iron and aluminum oxides ($Fe_2O_3$ and $Al_2O_3$) | 3.50 |
| Calcium oxide (CaO) | 5.17 |
| Calcium hydroxide ($Ca(OH)_2$) | 13.42 |
| Magnesium oxide (MgO) | 4.52 |
| Calcium carbonate ($CaCO_3$) | 22.17 |
| Calcium sulphate ($CaSO_4$) | 3.95 |
| Calcium chloride ($CaCl_2$) | 21.79 |
| Sodium chloride (NaCl) | 19.06 |
| Moisture at 110° C. | .52 |
| Total | 99.94 | may be mixed after heating to remove moisture and water of crystallization in the proportion of 100 parts of the waste product with 10 parts of magnesium oxide and 5 parts of silicate of soda. The mixture after thorough working to ensure intimate mixture is formed in the desired shape. It may be spread in an even layer to form a sheet and then subjected to a pressure of 20,000 pounds per square inch. The consolidated sheet may have reinforcing layers of paper at the faces thereof or embedded therein.

Suitable moulds may be used to form other shapes, and such shapes may be produced similarly by the application of pressure to the composition.

No exact explanation of the effect of the magnesium oxide and silicate of soda upon the composition can be presented. The mechanism of the reactions, if such reactions occur, is unknown. Nevertheless it is apparent that the characteristics of the composition are modified with respect to cohesion and hardness by such additions and that the result is a material having new properties which make it suitable for uses to which the waste product is not adapted.

It will be understood that the composition as described is illustrative of the invention. The waste product may vary in respect to the ingredients and proportions thereof and the proportions of added materials may likewise vary. Other changes may be made in compositions and procedure without departing from the invention or sacrificing any of the advantages.

As the waste products from the manufacture of soda ash by the ammonia-soda process are discharged or precipitated partly in suspension and partly in solution, the term "precipitated" as hereinafter used in the claim is not necessarily limited to a chemical precipitation with a reagent.

I claim:

A fire-resisting and heat-insulating composition comprising the precipitated waste products from the manufacture of sodium compounds by the ammonia-soda process, with the addition of magnesium oxide and silicate of soda.

In testimony whereof I affix my signature.

GEORGE B. PEEBLES.